United States Patent [19]
Menichetti

[11] Patent Number: 5,615,545
[45] Date of Patent: Apr. 1, 1997

[54] TOWABLE "V" RAKE AGRICULTURAL MACHINE

[75] Inventor: Silvano Menichetti, Umbertide, Italy

[73] Assignee: Sitrex S.r.l., Testina, Italy

[21] Appl. No.: 555,859

[22] Filed: Nov. 13, 1995

[51] Int. Cl.$^6$ ..................................... A01D 78/00
[52] U.S. Cl. ........................ 56/365; 56/377; 56/380
[58] Field of Search ................ 37/91, 323, 347, 37/302; 56/365, 372, 377, 378, 379, 380; 172/184, 574; 403/365, 372

[56] References Cited

U.S. PATENT DOCUMENTS

| 3,760,885 | 9/1973 | McKenzie | 37/302 X |
| 4,321,761 | 3/1982 | Hedblom | 37/302 |
| 4,723,402 | 2/1988 | Webster et al. | |
| 4,932,197 | 6/1990 | Allen | |
| 4,974,631 | 12/1990 | Snyder | |
| 4,981,390 | 1/1991 | Cramer, Jr. et al. | 403/372 X |
| 5,062,260 | 11/1991 | Tonutti | |
| 5,081,941 | 1/1992 | Weeks | 37/302 X |

Primary Examiner—Terry Lee Melius
Assistant Examiner—Robert Pezzuto
Attorney, Agent, or Firm—Browdy and Neimaark

[57] ABSTRACT

A "V" rake is provided that comprises:
- a first rigid support frame;
- a second articulated frame sliding on the first frame, made up of a plurality of mobile arms hinged to each other and to the first frame;
- at least one joint to slide the second frame on the first frame for opening and closing of said arms;
- a plurality of fingered wheels arranged on the plurality of mobile arms; and
- a plurality of bearing wheels for transport of the rake; in which said joint comprises:
  - support elements for sliding of the second frame on the first frame, constituted of:
    - anti-friction support plates made of a material with a low friction coefficient; and
    - bolts and relative spacer sleeves to position and contain the anti-friction support plates on said support elements.

9 Claims, 3 Drawing Sheets

TOWABLE "V" RAKE AGRICULTURAL MACHINE

BACKGROUND OF THE INVENTION

1. Field of the Invention

The present invention relates to the agricultural machines known as rakes, and more specifically to "V" rakes.

2. Description of the Prior Art

Up to date many types of so-called "V" rakes are known. They are characterised by the fact that they have a frame on which are hinged arms, to which are attached the fingerwheels which have the purpose of raking up the forage.

These arms can thus take on a number of different positions with respect to said frame. In particular, they can be opened to take on the typical "V" shape when working, or they can be closed, that is to say folded together, when manoeuvring and during transport, in order to reduce the working size.

The opening and closing mechanisms on these arms are made up of articulated polygons activated by hydraulic pistons.

The articulations of these polygons are mostly formed by articulated joints capable of allowing rotation, and by slip joints.

These joints, in particular, are commonly made using pieces of square or rectangular cross-section prismatic pipe sliding coaxially along other pipes with a similar cross-section but of a different size.

Normally speaking, these slip joints are reinforced at the points of maximum stress and wear.

The problem resulting from this manufacturing solution is that these slip joints or sleeves, when used in the mechanisms opening and closing the mobile arms of "V" rakes, have a high internal friction level. Because of this internal friction, a high level of force is required to move the slip joints which results in high wear, and there is also the danger of blocking during opening and closing operations if these are carried out while the machine is under stress.

Another problem is that these negative phenomena tend to increase as the machine gets older, until there is a risk of complete blockage of the machine during opening and closing operations, with the consequent risk of breakage of the machine's articulations.

SUMMARY OF THE INVENTION

The object of the present invention is to eliminate the problems above mentioned, and more specifically to reduce friction to a minimum during movement of the slip joints in the mechanisms for the opening and closing of the mobile arms of "V" rakes.

A further object is to provide a type of slip joint for "V" rakes that is reliable, rugged, quick and easy to maintain, and that therefore has a low operating cost.

According to the present invention, a "V" rake is provided that comprises:

a first rigid support frame;

a second articulated frame sliding on the first frame, made up of a plurality of mobile arms hinged to each other and to the first frame;

at least one joint to slide the second frame on the first frame for opening and closing of said arms;

a plurality of fingered wheels arranged on the plurality of mobile arms; and a plurality of bearing wheels for the rake transporting; in which said joint comprises:

support elements for sliding of the second frame on the first frame, made up of:

anti-friction support plates made of a material with a low friction coefficient; and bolts and relative spacer sleeves to position and contain the anti-friction support plates on said support elements.

The present invention will be further illustrated in the following description of an embodiment thereof, given as a non-limiting example, with reference to the enclosed drawings.

DETAILED DESCRIPTION OF THE PREFERRED EMBODIMENTS

As the structure of the rake is symmetrical with respect to the axis of the frame, one half of the structure only will be described for the sake of simplicity.

Figure 1:
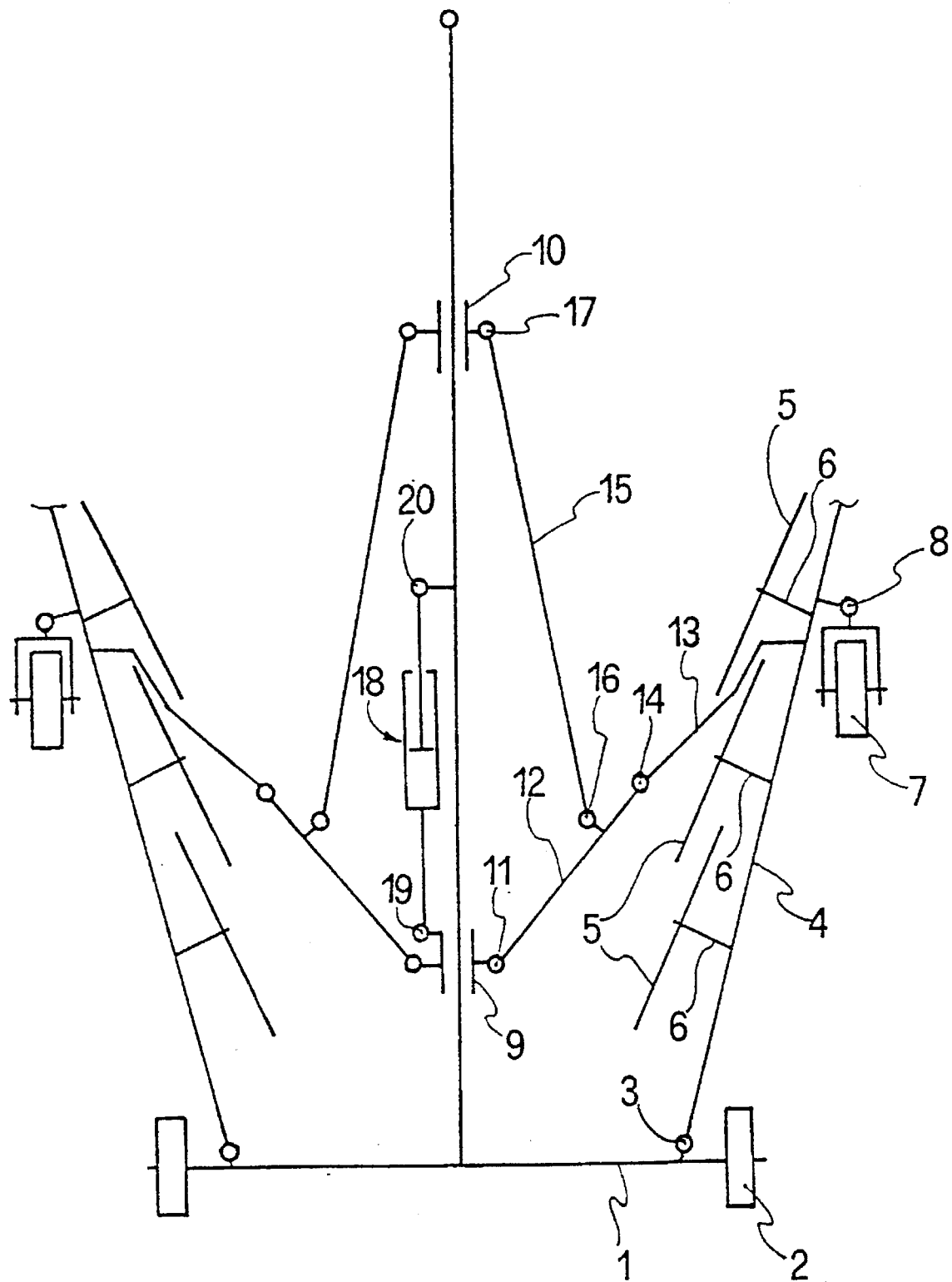
FIG. 1 is a plan view of a "V" rake according to the prior art.

With reference to FIG. 1, a plan view of a typical "V" rake is shown according to the functional diagram of the mechanisms for the opening and closing of the arms thereof.

It comprises a frame 1, substantially "T" shaped, integral with a pair of wheels 2 on the two side ends. Furthermore, said frame 1 is connected by means of hinges 3 to a pair of arms 4, one on each side (partially illustrated in the figure). A plurality of fingerwheels 5 are rotationally fixed to each arm 4 by means of respective mobile and elastic supports 6, each of said supports being integral with the above mentioned arm 4 by means of a respective hinge and spring (not shown in the figure). Each arm 4 also comprises a wheel 7, made integral therewith by a pivot pin 8 so that the wheel can rotate freely around its axis during manoeuvres.

Slip joints are mounted on the central part of the frame 1, and these joints are made up of two sliding supports 9 and 10, respectively, substantially identical in shape and constitution. The sliding support 9 slides along the frame 1 and is connected by means of two hinges 11, arranged on opposite sides, with respective mobile arms 12 which, in turn, are connected to the mobile arms 4 by means of arms 13, integral with the arms 4, by means of respective hinges 14.

The mobile arms 12 are also connected to the sliding support 10 by means of respective arms 15 and by means of hinges 16 and 17, respectively.

The sliding support 10 also slides along frame 1.

An hydraulic piston 18 is integral with the frame 1 and the sliding support 9, by means of respective hinges 19 and 20.

With this arrangement, each variation in the stroke of the hydraulic piston 18 corresponds to a variation in the position of the arms 4 and, more specifically, a decrease in the stroke of the hydraulic piston 18 corresponds to an outward movement of the arms 4 with respect to the frame 1 and, vice versa, an extension of the stroke of the piston 18 corresponds to an inward movement of the arms 4 with respect to frame 1.

Figure 2:
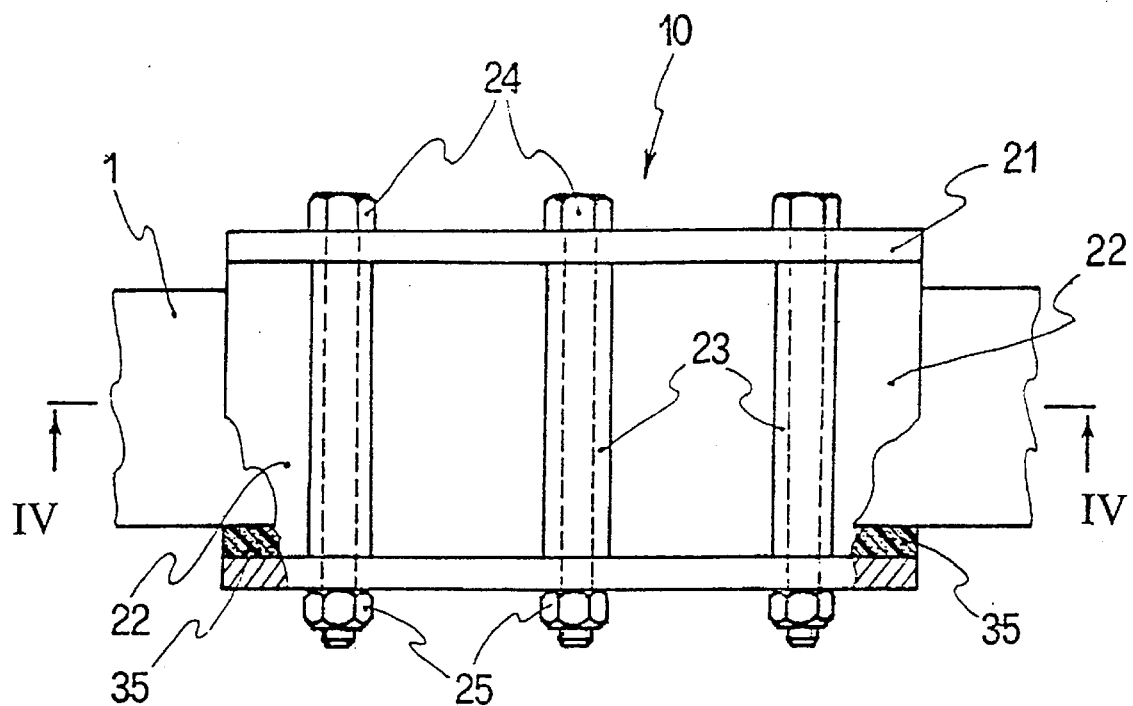
FIG. 2 is a plan view from above of the slip joint object of the present invention.

With reference now to FIG. 2, which illustrates a joint according to the present invention, a partial plan view is shown of a preferred embodiment of the group of one of the sliding supports and the frame 1 of the "V" rake of FIG. 1, and more specifically, the sliding support 10. In this, for the purpose of clarity, the connectors for hinges 17 have been omitted.

The sliding support 10 shows a structural positioning and containing element 21, with a substantially "U" shaped cross-section, capable of containing the anti-friction elements and of housing inside thereof the portion of frame 1 on which it slides.

Said structural containing element 21 is closed on top by an anti-friction top element 22 and held in position (in a manner that will be illustrated in more detail further) by spacing sleeves 23 by means of respective bolts 24 and nuts 25.

As will be more clearly understood from the following, these spacer sleeves 23 have the dual purpose of holding the anti-friction top element 22 in position, and of maintaining a perfect right angle between the walls of said containing element 21, the anti-friction elements and the frame 1.

Figure 3:
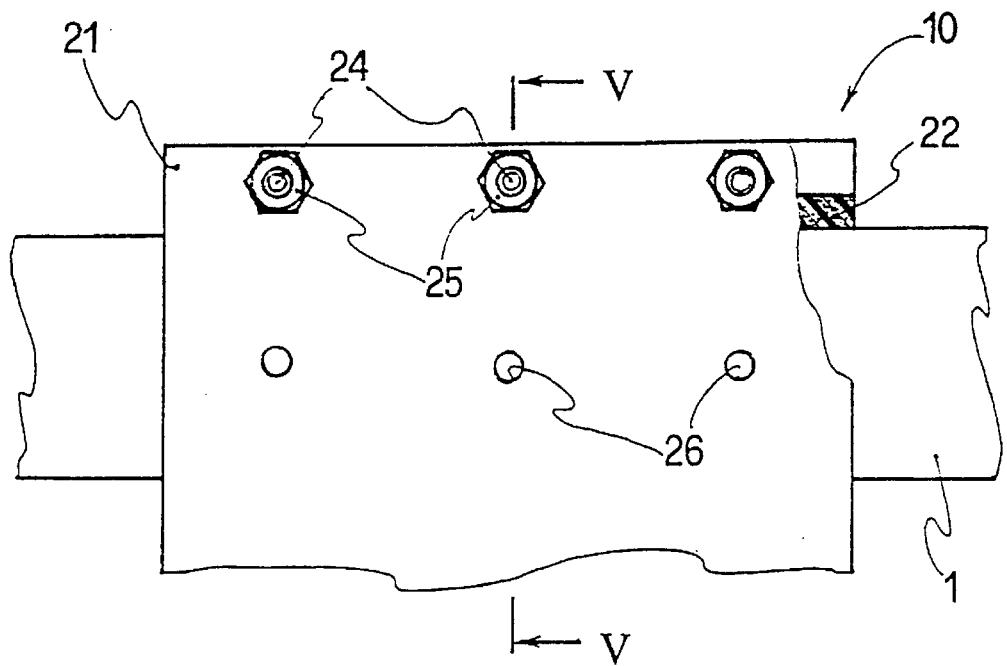
FIG. 3 is a partial side view of the joint of FIG. 2.

With reference now to FIG. 3, a partial side elevation is shown of the group formed by the sliding support 10 and the frame 1. Three threaded bores 26 are present on the outer side surface, and serve for housing respective lock screws (not shown in the figure) for locking the anti-friction elements (not shown in the figure), the whole being arranged inside said sliding support 10.

Figure 4:
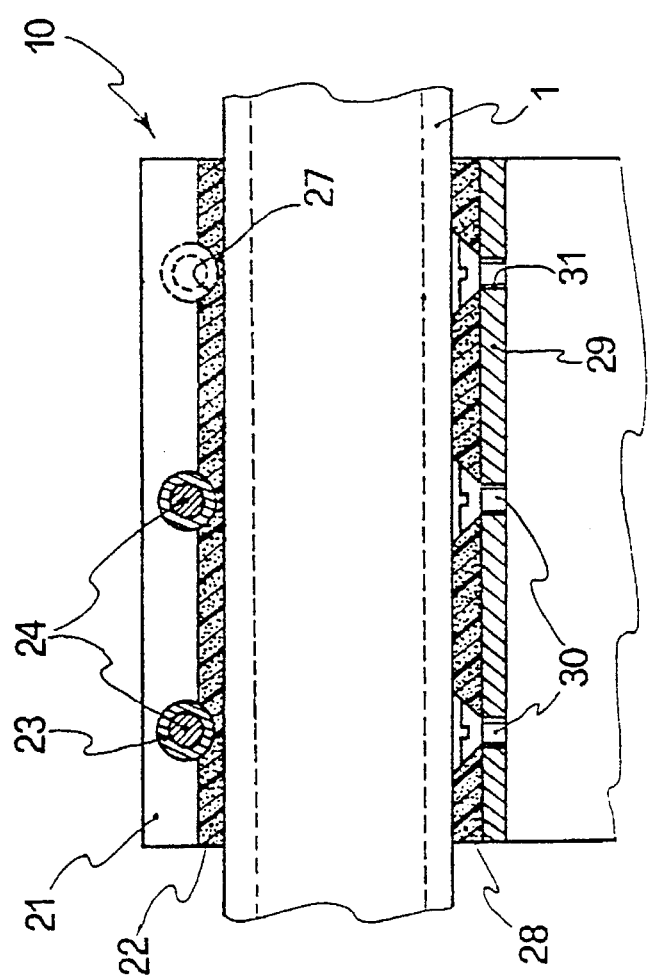
FIG. 4 is a longitudinal section view of the joint of FIG. 2.

With reference now to FIG. 4, a longitudinal section taken along line A–A' of FIG. 2 of the group made up of the sliding support 10 and the frame 1 is shown.

As can be seen, the anti-friction top element 22 has three housings 27 to house the respective spacer sleeves 23 in such a way as to prevent movement of the element in a longitudinal direction following the relative movement of frame 1 and sliding support 10.

In a similar way, a bottom anti-friction element 28 is arranged between the frame 1 and the lower wall 29 of the support 10. This anti-friction bottom element 28 is locked into position on the bottom portion 29 by means of three screws 30 which are screwed into the respective bores 31 in said bottom wall 29 of support 10.

In a similar manner and as illustrated below, two more anti-friction elements 34 and 35 are arranged between the respective side walls 32 and 33 (not shown in this figure) of the containing element 21 and the frame 1.

Figure 5:
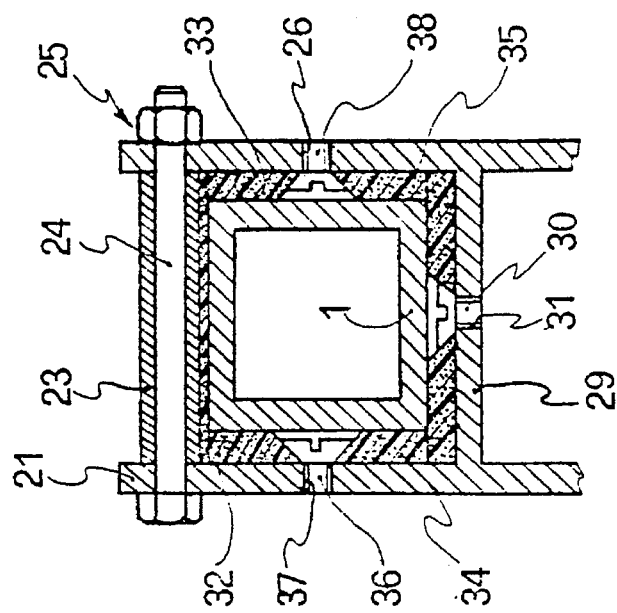
FIG. 5 is a cross section view of the joint of FIG. 2.

With reference now to FIG. 5, a cross-section of the group made up of the sliding support 10 and the frame 1 is shown, taken along line B–B' of FIG. 3.

As can be clearly seen, as well as the anti-friction top element 22 and the anti-friction bottom element 28, further anti-friction side elements 34 and 35, respectively, are arranged between the side walls 32 and 33 of the containing element 21 and the frame 1.

The anti-friction side element 34 is fixed to the side wall 32 of the containing element 21 by means of three screws 36 housed in an equal number of threaded bores 37 formed in said wall 32.

In a similar way, the anti-friction element 35 is fixed to the side wall 33 of said containing element 21 by means of three screws 38 housed in the respective bores 26.

With this arrangement, the sliding support 10 is free to slide on frame 1, even under stress, given the extremely low level of friction provided by the anti-friction elements 22, 28, 32 and 35, respectively, thus greatly reducing wear and maintenance for said support and thus increasing the working life thereof.

The present invention is not limited to the embodiment described, but comprises any variation thereof that falls within the scope of the following claims.

I claim:
1. A "V" rake comprising:
   a first rigid support frame;
   a second articulated frame sliding on the first frame, including a plurality of mobile arms hinged to each other and to the first frame;
   at least one joint including means to slide the second frame on the first frame for opening and closing of said mobile arms;
   a plurality of fingered wheels arranged on the plurality of mobile arms; and
   a plurality of bearing wheels for transporting the rake; wherein said joint comprises:
      support elements including means for sliding the second frame on the first frame, said support elements including
      anti-friction supporting means including a material with a low friction coefficient; and
      means to position and contain said anti-friction support means on said support elements wherein the positioning and containing means comprise a sleeve formed by two structural elements, the two structural elements comprise:
         a flat plate, and a plate with a "U" shaped cross section, the two structural elements held together by fixing means.

2. The "V" rake according to claim 1, in which said anti-friction means are plates of a material having a low friction coefficient.

3. The "V" rake according to claim 1, in which said material having a low friction coefficient is bronze.

4. The "V" rake according to claim 1, in which said positioning means further comprise spacer sleeves integral with said fixing means.

5. The "V" rake according to claim 1, in which said fixing means are bolts.

6. The "V" rake according to claim 1, in which said material having a low friction coefficient is polyamide resin.

7. The "V" rake according to claim 1, in which said material having a low friction coefficient is polyacetal resin.

8. The "V" rake according to claim 1, in which said material having a low friction coefficient is polyethylene resin.

9. The "V" rake according to claim 1, wherein the bearing wheels are mounted on the first rigid support frame and the second articulated frame.

* * * * *